United States Patent
Shivam et al.

(10) Patent No.: US 12,035,194 B2
(45) Date of Patent: *Jul. 9, 2024

(54) AUTOMATICALLY SWITCHING COMMUNICATION PATHWAYS BETWEEN CONNECTED DEVICES

(71) Applicant: Transform SR Brands LLC, Hoffman Estates, IL (US)

(72) Inventors: Puneet Shivam, Schaumburg, IL (US); Angel Fernando Favila, Lake in the Hills, IL (US); Nicholas James Shuttleworth, Schaumburg, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,510

(22) Filed: Apr. 26, 2023

(65) Prior Publication Data

US 2023/0262560 A1    Aug. 17, 2023

Related U.S. Application Data

(63) Continuation of application No. 17/943,264, filed on Sep. 13, 2022, now Pat. No. 11,678,241, which is a
(Continued)

(51) Int. Cl.
*H04W 36/16* (2009.01)
*H04W 28/08* (2023.01)
(Continued)

(52) U.S. Cl.
CPC ......... *H04W 36/165* (2013.01); *H04W 28/08* (2013.01); *H04W 36/03* (2018.08);
(Continued)

(58) Field of Classification Search
CPC ... H04W 28/08; H04W 36/03; H04W 36/165; H04W 36/32; H04W 40/02; H04W 76/14;
(Continued)

(56) References Cited

U.S. PATENT DOCUMENTS 11,490,309 B2    11/2022   Shivam et al.
2015/0365217 A1  12/2015   Scholten et al.
(Continued)

OTHER PUBLICATIONS

Int'l Search Report and Written Opinion AppIn No. PCT/US2018/044958 dated Oct. 3, 2018.
(Continued)

*Primary Examiner* — Awet Haile
(74) *Attorney, Agent, or Firm* — McAndrews, Held & Malloy, Ltd.

(57) ABSTRACT

Systems and methods for switching communication pathways between a mobile device and connected "Internet of Things" (IOT) device are described to improve scalability and communication between devices. An application on the mobile device may determine whether local or virtual local endpoints are available to route communications without using a remote IoT server endpoint. Communications and updates from multiple co-located, but not necessarily user-related connected devices may be aggregated, and sent to a remote IoT server to reduce the peak load scalability requirement of the server.

20 Claims, 8 Drawing Sheets

Related U.S. Application Data continuation of application No. 16/542,226, filed on Aug. 15, 2019, now Pat. No. 11,490,309, which is a continuation of application No. 15/667,514, filed on Aug. 2, 2017, now abandoned.

(51) Int. Cl.

| | | |
|---|---|---|
| *H04W 36/00* | (2009.01) | |
| *H04W 40/02* | (2009.01) | |
| *H04W 76/14* | (2018.01) | |
| *H04W 36/32* | (2009.01) | |
| *H04W 76/15* | (2018.01) | |
| *H04W 76/23* | (2018.01) | |
| *H04W 84/18* | (2009.01) | |
| *H04W 88/16* | (2009.01) | |

(52) U.S. Cl.
CPC ........... *H04W 40/02* (2013.01); *H04W 76/14* (2018.02); *H04W 36/32* (2013.01); *H04W 76/15* (2018.02); *H04W 76/23* (2018.02); *H04W 84/18* (2013.01); *H04W 88/16* (2013.01)

(58) Field of Classification Search
CPC ..... H04W 76/15; H04W 76/23; H04W 84/18; H04W 88/16; Y02D 30/70
See application file for complete search history.

(56) References Cited

U.S. PATENT DOCUMENTS

| | | | |
|---|---|---|---|
| 2016/0198285 A1* | 7/2016 | Lin | H04W 4/38 |
| | | | 709/209 |
| 2016/0344841 A1* | 11/2016 | Wang | H04L 67/63 |
| 2017/0026195 A1* | 1/2017 | Pan | G08C 17/02 |
| 2017/0135151 A1* | 5/2017 | Fujishiro | H04W 76/34 |
| 2017/0223153 A1 | 8/2017 | Johnsen et al. | |
| 2017/0272121 A1* | 9/2017 | Dao | H04W 4/70 |
| 2017/0353556 A1 | 12/2017 | Seenappa et al. | |
| 2018/0041380 A1* | 2/2018 | Lin | H04L 41/0659 |
| 2018/0109308 A1 | 4/2018 | Leroux | |
| 2018/0123898 A1* | 5/2018 | Yakuwa | H04L 41/40 |
| 2018/0176079 A1* | 6/2018 | Teo | H04W 52/0219 |
| 2018/0176769 A1* | 6/2018 | Gupta | H04W 8/245 |
| 2018/0183587 A1 | 6/2018 | Won et al. | |
| 2018/0234895 A1 | 8/2018 | Shin | |
| 2020/0305116 A1* | 9/2020 | Berggren | H04W 64/00 |

OTHER PUBLICATIONS

Int'l Preliminary Report on Patentability ApplN No. PCT/US2018/044958 dated Feb. 13, 2020.

* cited by examiner

AUTOMATICALLY SWITCHING COMMUNICATION PATHWAYS BETWEEN CONNECTED DEVICES

CLAIM OF PRIORITY

This patent application is a continuation of U.S. patent application Ser. No. 17/943,264, filed on Sep. 13, 2022, which is a continuation of U.S. patent application Ser. No. 16/542,226, filed on Aug. 15, 2019 (now U.S. Pat. No. 11,490.309), which is a continuation of U.S. patent application Ser. No. 15/667,514, filed on Aug. 2, 2017 (now abandoned). The above referenced documents are hereby incorporated herein by reference in its entirety.

BACKGROUND

In an Internet of Things (IoT) network, a client computing device (e.g., a mobile device) typically sends control and monitoring requests to an IoT server, which communicates the message to an IoT device at a specific location. The IoT device's state can then be altered based upon the client device's original request. For example, an IoT device may be a thermostat, entertainment device, lighting system, fire alarm, or houseware appliance, and the device's power state (i.e., on/off, etc.) may be controlled remotely.

However, this communication pathway contains inherent latencies because communications must pass through the remote IoT server, which is often a remote cloud server. Different types of processing that occur within various clouds may introduce some delays, and unpredictable heavy traffic over the network may contribute to latencies in communicating messages and requests between components. The cloud's location relative to the client computing device and IoT device can also contribute to delays. For example, if the IoT device is in New York, but the cloud server is in San Francisco, communications between the endpoints can typically require at least 2-4 seconds.

Such latencies are not only inconvenient, but they can negatively affect user experience, since the delayed signals may appear to indicate an inefficient or malfunctioning system. Latency issues and heavy traffic are predictable in the current architecture, since each IoT device will be communicating their states and other diagnostic data to the IoT cloud. In addition, future homes and businesses are likely to have networks with even greater numbers of connected IoT devices. As such, faster and more efficient communication pathways will be necessary to handle increased growth and complexities of IoT networks.

SUMMARY

This disclosure generally relates to managing communication pathways between Internet of Things (IoT) devices and components. The disclosed methods and systems detect whether a mobile client device is on the same network as a connected IoT device (e.g., a local network), or whether an alternative pathway (e.g., a virtual local network) is available. A determination may be made whether these communication pathways are faster than sending communications through a remote cloud server.

In a local communication pathway, the client device and the IoT device can directly communicate to each other over WiFi, or another local network, without routing communications through a remote server endpoint. A virtual local network is identifiable as a local network in a region where the IoT device is directly reachable faster than via the remote cloud server. If neither option is available, then the client computing device may send communications, to the remote server endpoint, which in turn communicates to the IoT device via IoT cloud or local, direct communication. After receiving the client device's communication, the connected IoT device can send state updates and/or diagnostic information to the remote IoT cloud server. The IoT device may aggregate communications over a predetermined time before forwarding them to the IoT cloud server. In one aspect, an IoT device may serve as an IoT Devices Hub/Gateway, which aggregates communications from multiple IoT devices for a predetermined period, and forwards the communications to the IoT cloud server.

In another embodiment, an IoT application can tag previously used locations and the mode of communication at those particular locations. Those saved locations can be used in later determinations for the optimal mode of communication.

The disclosed methods and systems switch communication pathways for faster performance and reduced instantaneous scalability requirements on the IoT server. The present subject matter reduces the capital expenditure of setting up cloud servers at multiple locations for performance, redundancy, and scalability. Inherent latencies are reduced, as local communications can occur in the sub-second range, especially if the user is near the IoT device, and performance and user experience can be vastly improved.

DETAILED DESCRIPTION OF EMBODIMENTS

Figure 1:
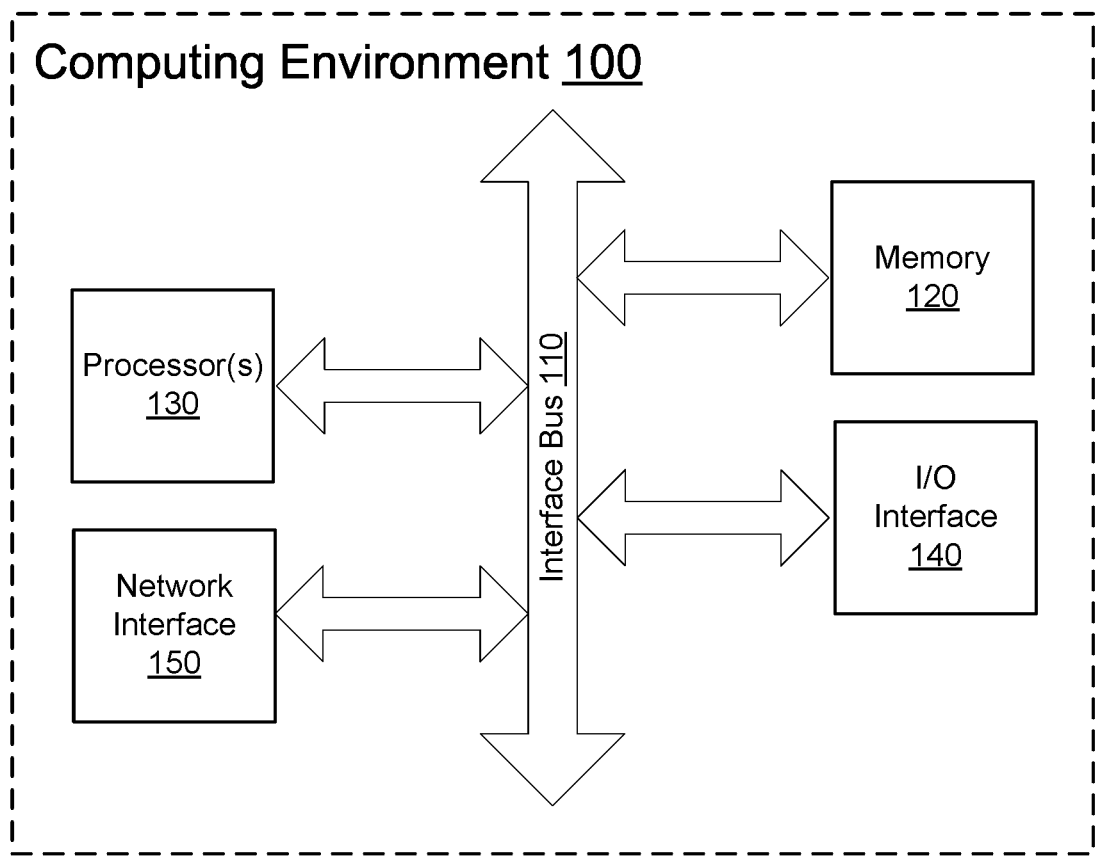
FIG. 1 depicts an example general purpose computing environment in which embodiments of the invention may be implemented.

Various aspects of the present disclosure described herein are generally directed to systems, methods, and computer-readable storage media for, among other things, automatically switching communication pathways between a controlling device (e.g., a mobile device) and a controlled Internet of Things (IoT) device connected to a network. Communication may flow directly between a controlling device to the controlled device via a local or virtual local network, or from the controlling device to the controlled device, via an IoT cloud server, depending on the determined optimal communication pathway. An IoT client application, which runs on the controlling device, may be used to initiate communications.

As used herein, a "connected device" refers to an addressable device having network connectivity that is configured to communicate with other computing devices via one or more networks. That is, a connected device is capable of serving as an endpoint, connection point, and/or a redistribution point of a communication session communicatively coupling the connected device with another network-connected computing node. In an embodiment, a connected device is an IoT client device (i.e., controlling device) and an IOT device (i.e., controlled device). In contrast, "non-connected device" refers to a non-addressable device lacking network connectivity that is not configured to communicate with other computing devices via one or more networks.

The present disclosure provides methods and systems to enable the controlling device (i.e., client device) to directly communicate with the controlled device (i.e., IoT device) when the system determines that the devices are on the same network and/or in the same specified region. In an embodiment, when a communication pathway is determined to be more efficient than using the IoT cloud server, the IoT application will automatically switch to the local communication endpoint so the IoT application can communicate directly with the IoT device. The IoT device can then communicate with the IoT cloud server to report its state or other diagnostic data.

In another embodiment, when the IoT client device and the IoT device are not on the same network (e.g., WLAN), the distance (e.g., number of hops) between the devices, and their distances to the IoT cloud server may be considered when determining the optimal communication pathway. For example, a user may be using his/her IoT client device in a neighbor's home, such that the IoT client device connected to the neighbor's network. The IoT device may be connected to the user's home network. If the number of hops between the IoT client device's network and the IoT device's network is less than the number of hops needed to communicate through the IoT cloud server, then the devices may switch to virtual local communication. Virtual local communication can provide a reduction in latency and similar benefits as local, direct communication between devices.

In an embodiment, the switching of communication pathways may be done along with aggregating IoT device communication updates from co-located, but not necessarily related user devices. The IoT cloud server is subsequently updated to reduce the peak load scalability requirement of the IoT cloud server.

According to an aspect of the subject matter, a system is provided for contextual interaction with connected devices. The system includes a client device having a display on which a user interface is presented. The user interface enables access to functionalities provided by the connected devices and the IoT application on the user device. The system monitors, at the mobile device, data representing a current position of the mobile device within a structure. The system also determines, at a first time, that the current position is within a threshold proximity of a first location of the structure. In response to determining that the current position is within the threshold proximity, the system updates the user interface to emphasize a first location interface corresponding to the first location over interfaces corresponding to other locations of the structure.

Having briefly described an overview of embodiments of the invention, an example of a computing environment suitable for implementing aspects of the embodiments is described below. Referring to the figures generally and initially to FIG. 1 in particular, an exemplary computing environment in which embodiments of the present invention is depicted and generally referenced as computing environment 100. As utilized herein, the phrase "computing system" generally refers to a dedicated computing device with processing power and storage memory, which supports operating software that underlies the execution of software, applications, and computer programs thereon. As used herein, an application is a small in storage size, specialized program that is downloaded to the computing system or device. In some cases, the application is downloaded from an "App Store" such as APPLE's APP STORE or GOOGLE's ANDROID MARKET. After download, the application is generally installed on the computer system or computing device. As shown by FIG. 1, computing environment 100 includes bus 110 that directly or indirectly couples the following components: memory 120, one or more processors 130, I/O interface 140, and network interface 150. Bus 110 is configured to communicate, transmit, and transfer data, controls, and commands between the various components of computing environment 100.

Computing environment 100 typically includes a variety of computer-readable media. Computer-readable media can be any available media that is accessible by computing environment 100 and includes both volatile and nonvolatile media, removable and non-removable media. Computer-readable media may comprise both computer storage media and communication media. Computer storage media does not comprise, and in fact explicitly excludes, signals per se.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EE-PROM; flash memory or other memory technology; CD-ROMs; DVDs or other optical disk storage; magnetic cassettes, magnetic tape, magnetic disk storage or other magnetic storage devices; or other mediums or computer storage devices which can be used to store the desired information and which can be accessed by computing environment 100.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 120 includes computer-storage media in the form of volatile and/or nonvolatile memory. The memory may be removable, non-removable, or a combination thereof. Memory 120 may be implemented using hardware devices such as solid-state memory, hard drives, optical-disc drives, and the like. Computing environment 100 also includes one or more processors 130 that read data from various entities such as memory 120, I/O interface 140, and network interface 150.

I/O interface 140 enables computing environment 100 to communicate with different input devices and output devices. Examples of input devices include a keyboard, a pointing device, a touchpad, a touchscreen, a scanner, a microphone, a joystick, and the like. Examples of output devices include a display device, an audio device (e.g., speakers), a printer, and the like. These and other I/O devices are often connected to processor 110 through a serial port interface that is coupled to the system bus, but may be connected by other interfaces, such as a parallel port, game port, or universal serial bus (USB). A display device can also be connected to the system bus via an interface, such as a video adapter which can be part of, or connected to, a graphics processor unit. I/O interface 140 is configured to coordinate I/O traffic between memory 120, the one or more processors 130, network interface 150, and any combination of input devices and/or output devices.

Figure 2:
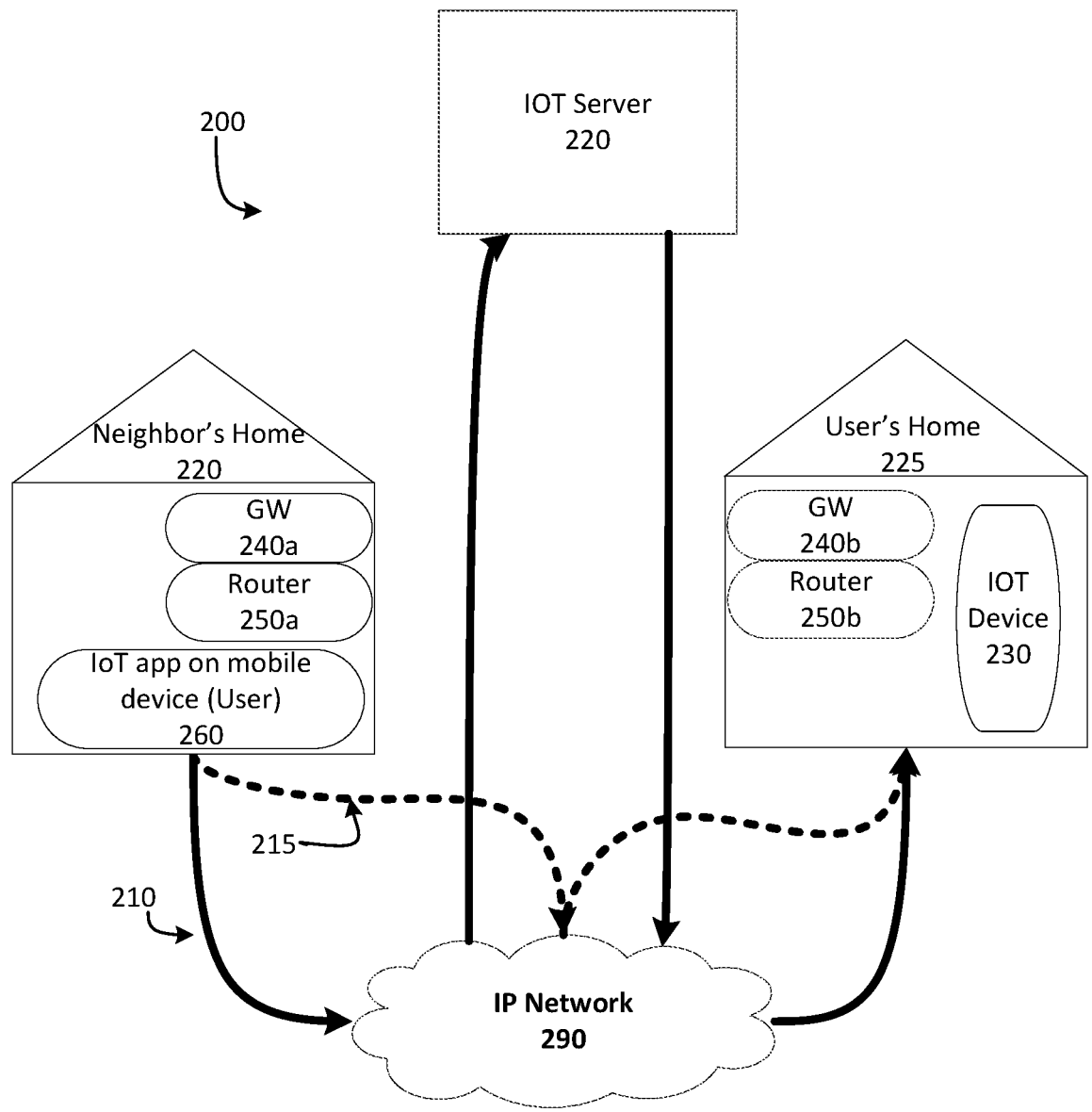
FIG. 2 depicts an exemplary system architecture for implementing an automatic switch between the IoT cloud and local communication in an IoT client application.

Network interface 150 enables computing environment 100 to exchange data with other computing devices (e.g., client device 210, connected devices 230A-C, and server 250 of FIG. 2) via any suitable network (e.g., network 250). In a networked environment, program modules depicted relative to computing environment 100, or portions thereof, may be stored in a remote memory storage device accessible via network interface 150. It will be appreciated that the network connections shown are exemplary and other means of establishing a communications link between the computers may be used.

FIG. 2 depicts an example of a system architecture for use in an IoT network 200, and various communication pathways for implementing aspects of the subject matter. In particular, pathways for a user to communicate with an IoT device at a remote location (e.g., a neighbor's home) are depicted. The overall system comprises the IoT cloud server 220, the IoT device 230, an IoT Devices Hub/Gateway 240, and an IoT application on the mobile device 260, as described herein. The components may communicate over a local IP network 290 through communication pathways 210 and 215.

The IoT server 220 is a communication endpoint in the network that maintains the service set identifier (SSID), the names and IP addresses of the IoT devices, and the IoT Devices Hub/Gateway IP address. In an embodiment, the server 220 can store a list of tagged locations where the IoT client application has previously identified the server, and maintain the local communication decision making threshold parameters for each location or region, as further described below (see FIG. 5). Network parameters may be measured at the IoT server, such as thresholds indicative of number of hops, or approximate distance.

Additionally, the IoT server 220 can regularly provide any of the above information to the IoT client application on the IOT client device, and/or provide the information in response to a fetch request from the client. The server 220 may accomplish this by sending messages to its IoT client application on the mobile user devices. In this aspect, the server forms an association with the client applications to allow communication with the IoT Devices Hub/Gateway, where the components may, for example, communicate to determine a master component, and master IoT Devices Hub/Gateway. The master device(s) and hub may be determined based on proximity in a specified radius of a geographical location.

The IoT device 230 communicates to the server to register and identify itself on the network 200. After registration, the IoT device sends its current SSID, geo-location, name, IP address, and the IP address of the IoT Devices Hub/Gateway 240 to the IoT server 220. An updated set of information is communicated to the server whenever there is a change in the SSID or the IP address of the IoT device 230 or IoT Devices Hub/Gateway 240. By way of example and not limitation, the IoT device may be a thermostat, medical device, fire alarm, household appliance, or entertainment equipment.

The IoT client application 260 runs on the IoT client device (e.g., a mobile device) and manages aspects of communication between system components, including threshold parameters for local communication decision making. For example, the IoT application can fetch the required number of hops to the server of IoT device, indicate distance from the IoT cloud server, and communicate network traffic congestion and/or other indicators related to threshold parameters used to determine optimal communication pathways. The IoT application may also utilize the host device's geo-location or IP address to identify these parameters.

The IoT Devices Hub/Gateway 240 serves as a connection point between system components. The IoT Devices Hub/Gateway 240 enables packets, requests, and other communications to be relayed between the IoT client device, IoT devices 230, and the IoT cloud server 220. In an embodiment, the IoT device 230 may serve as the IoT Devices Hub/Gateway 240*b*. Similarly, traditional hubs, gateways, and hardware components able to connect and relay information between the various system components can serve as the Gateway. In another embodiment, a co-located, but not necessarily related device may serve as an IoT Device Hub/Gateway, and aggregate or route communications, in accordance with aspects of the present invention (e.g., Gateway 240*a* in the neighbor's home 220, or Gateway 240*b* in the User's home 225). The IoT Devices Hub/Gateway 240 may be chosen from a group or association of possible IoT Devices Hub/Gateways within the system, as further described below in FIG. 3.

Under normal circumstances, the client computing device 260 makes all control and monitoring requests for an IoT device 230 at a specific location (e.g., the user's home) over an IP network 290 (e.g., LAN) to an IoT server endpoint 220. The IoT server endpoint 220 has information about local communication endpoints (e.g., IoT Devices Hub/Gateway 240 and router 250) to which the information may be forwarded. The IoT server 220 then communicates the request over IP network 290 to the IoT device 230. Depending on the request received, the IoT device may, in response, communicate a notification back to the IoT server 220 updating its state information, or other diagnostic information. In an embodiment, notifications and communications from the IoT device may be aggregated at Gateway 240*b* for a period of time, and then forwarded to the IoT server 220.

As illustrated by communication pathway 210, a user in a neighbor's home 220 makes a request through an application on a client device 260, to alter the state of an IoT device 230 in the user's home 225. For example, a user may request to switch off a light (e.g., the IoT device 230). The request may be routed, using router 250*a* or a Gateway 240*a*, over an IP network 290 to the IOT server 220. The server 220 then sends the request over an IP network 290 to the user's home. A router 250*b* can direct the request from the IP network to the IoT device 230 (i.e., the light), which executes the request and turns off. The IoT device 230 may then send a notification back to the IoT server 220 indicating that it has been turned off.

However, when a client computing device with an IoT application 260 connects to the same IP network 290 that has IoT devices, there is a possibility of switching to local communication so that the devices may directly communicate with each other. In an embodiment, the IoT client application 260 communicates using this local communication pathway 215 over WiFi direct. As such, local communication endpoints need not be obtained from the server. Local communication allows for faster performance for actions such as monitoring and control requests. This also reduces instantaneous scalability requirements on the IoT server, and reduces the investment in establishing IoT cloud servers in multiple areas. As a result, improved performance and redundancy can provide a highly available system to users. Moreover, when local communication happens with an IoT device, the action response comes directly from the IoT device after completion of the action, which eliminates time delays for notification updates.

An example of this is illustrated by communications pathway 215. A user in a neighbor's home 220 may request to alter the state of an IOT device 230 in the user's own home 225. When the user connects to his/her neighbor's WiFi network, the IoT application may make a determination for a preferred communication pathway to forward the request. This may include determining whether the mobile device and the IoT device are in the same WiFi network, and if not, whether a faster, reachable local network is available without using the remote cloud server endpoint. If a more efficient pathway without the IoT cloud server is found, then requests to alter or monitor the state of the IoT device 230 in the user's home 225 are routed through a local network or virtual local network, and sent directly to the IoT device 230 in the user's home. In this example, both the local and virtual local network scenarios are represented by the IP network 290. Subsequently, the IoT device may send state updates directly to the server. As further described in FIG. 3, updates may also be aggregated at an IoT Devices Hub/Gateway 240 for a predetermined period, and forwarded the IoT server.

Figure 3:
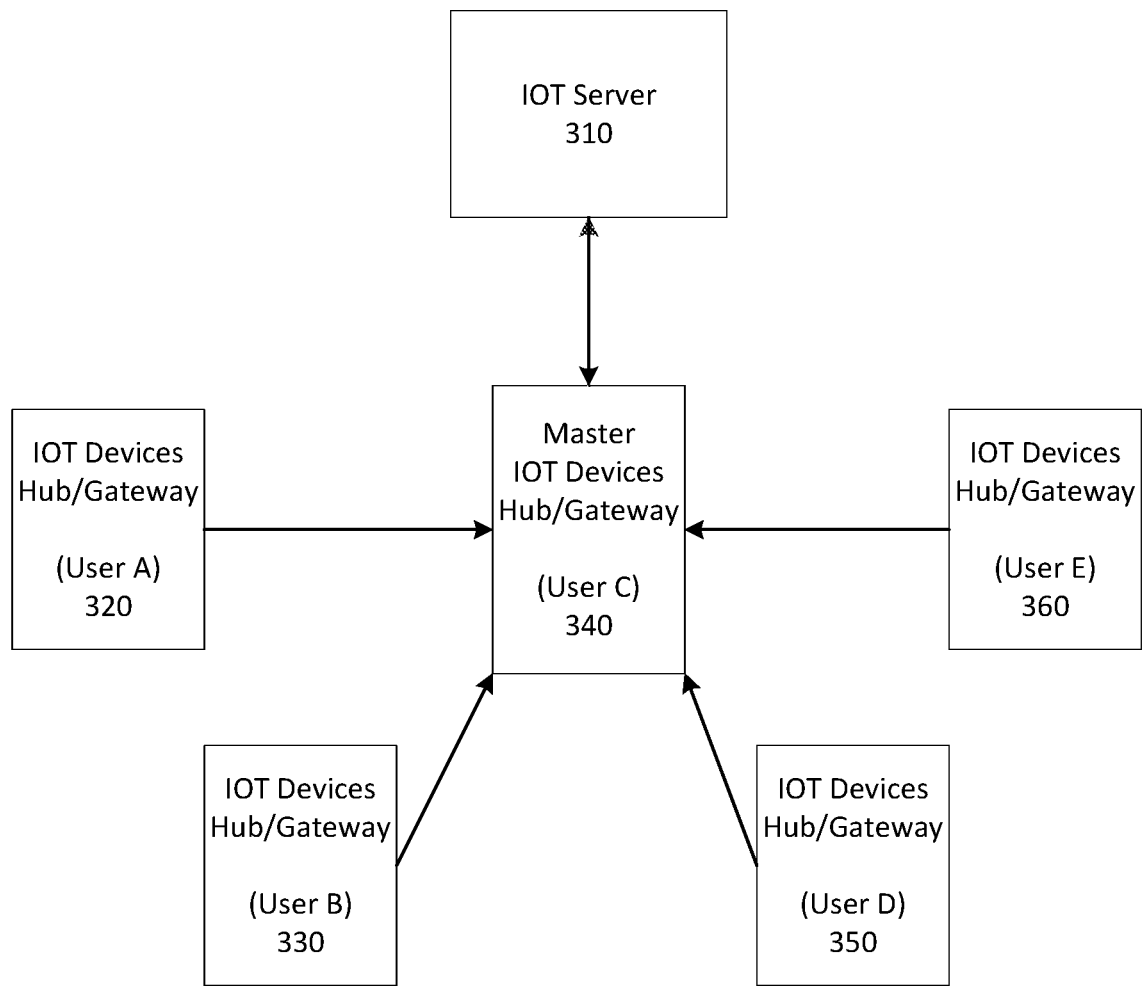
FIG. 3 depicts an exemplary system architecture for aggregating communications from IoT devices to the cloud server.

FIG. 3 illustrates an exemplary architecture for aggregating all user communications to the IoT cloud server at a master IoT Devices Hub/Gateway 340, and sending the communications from the master hub/gateway to the IoT cloud server 310. This may be particularly useful in homes, buildings, and regions with a number of IoT devices attempting to communicate their states and diagnostic data to the IoT cloud server. An apartment complex or small neighborhood, for example, may have several requests per second going out of that region to the same IoT cloud server, and this method ensures that all requests are efficiently aggregated, in order to reduce peak scalability load of the IoT cloud server.

As discussed above in FIG. 2, IoT devices may serve as an IoT Devices Hub/Gateway to aggregate and send communication updates to the IoT cloud server about the IoT device and/or other IoT devices on the local network or virtual local network. That is, any IoT device can act as an IoT Devices Hub/Gateway 320, 330, 340, 350, 360 to send communications to the IoT server 310. Such communications may include the SSID and IP address of one or more IoT devices to the IoT application using WiFi Direct.

The IoT devices 320, 330, 350, and 360 forwarding communications to the master 340 may be unrelated to each other and controlled by separate users (e.g., Users A, B, D, and E). Alternatively, the devices may be operated by a single user, and receive communications from information input on that user's client device and IoT application.

In an embodiment, any device capable of communicating with the IoT server 310 may become a virtual IoT Devices Hub/Gateway, and perform the same functionality as the IoT Devices Hub/Gateway. For example, a non-IoT device such as a thermostat may serve as the virtual IoT Devices Hub/Gateway, if it can aggregate communications and forward them to the IoT server. The virtual IoT device may also request communications from other IoT devices and receive forwarded communications from those same devices.

In an alternative embodiment, the communications can be aggregated over 't' time units before being sent to the IoT cloud server. The communications may originate from a single user or plurality of unrelated users within a region. This method can vastly reduce the IoT cloud server's peak load scalability requirements by a single digit or double digit factor, especially if the user is near the IoT device. If the number of connected devices is in the range of millions, or even billions, the scalability required for a service provider may be reduced even more.

Similarly, the server 310 can aggregate messages and send to several users in a co-located geographical region. The IoT cloud 310 has the option of sending aggregated messages (e.g., http or any other protocol based messages) for a group of users to the master IoT Devices Hub/Gateway, which further distributes the messages to the respective members of the group.

The IoT cloud server 310 knows the location of IoT devices, based on either the IP address of the GPS in the IoT Devices Hub/Gateway 340, and the respective owner (i.e., client device) controlling those IoT devices. The server 310 may send a message to the client devices within a selected region, in order to form an association.

For example, the IoT application may receive a message from the IoT server to accept an invitation to form and/or join a group comprising possible IoT Devices Hubs/Gateways. In an embodiment, the IoT cloud server may form a group based on a security protocol. For example, a positive response assuring full privacy of the user may allow that user's IoT device to join a group.

The IoT cloud 310 can then choose one of the potential IoT Devices Hubs/Gateways to be the master device 340 to aggregate requests and send the identity (e.g., IP address) of the requesting IoT device to all other users of the group. The master may be selected using a back end algorithm running on the IoT server. In exemplary embodiments, the algorithm determines the master IoT Devices Hub/Gateway based on a time-slicing mechanism, power availability, a round-robin alternation, or number of requests sent out in a particular time slot. That is, the IoT device that has sent out the highest quantity of requests during a particular time period becomes the master IoT Devices Hub/Gateway in the future. Other considerations can include network speed, location, or other efficiency-related criteria to enable optimal communication between components.

The IoT cloud server 310 instructs the IoT devices 320, 330, 340, 350, 360 to send their updates to the IoT cloud server via the master IoT Devices Hub/Gateway 340. The master then aggregates the communication for a designated period of time, and forwards the communications to the IoT cloud server 310 in a single action.

There can also additional security features protecting communications between each IoT device and the master gateway device. A separate pre-negotiated encryption key can be used by each IoT device to encrypt communication packets sent to the master IoT Devices Hub/Gateway 340. The key may be sent to and used by the IoT cloud server 310 to decrypt the communication packets forwarded from the master device. The encryption key can be changed periodically to ensure greater security, and in an embodiment, either the IoT application, or the IoT device can communicate the encryption key to the IoT cloud server.

Figure 4:
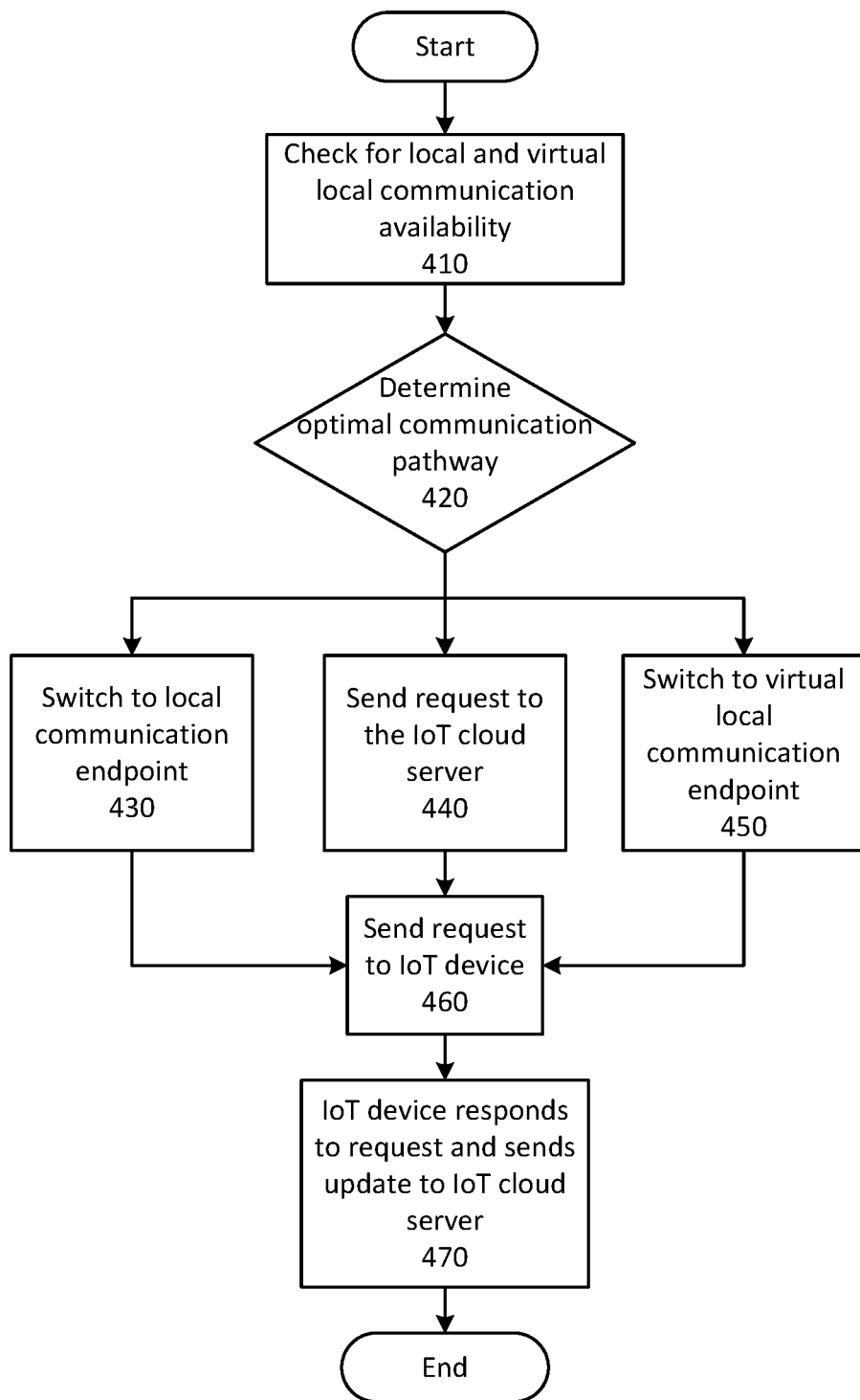
FIG. 4 depicts an exemplary process for routing communications according to aspects of the present invention.

FIG. 4 is a flowchart illustrating an embodiment of a process for determining an automatic switch of communication pathways. In box 410, the IoT application running on the client device may initiate a check for a local communication pathway and a virtual local communication pathway to communicate with an IoT device. This check can occur before the user requests to communicate with an IoT device, such as when a change of network is detected, or when the request is initiated. To determine if local communication is available, the IoT application can check whether the client and IoT devices are on the same network, and/or whether the IoT device is reachable via WiFi direct.

Virtual local communication may occur if the client device and the IoT are not on the same local network, but they are within a specified region (e.g., a tagged region), wherein communications can occur through local networks, without using the IoT cloud server. For example, if the user operating the client device is at a neighbor's house, a specified region where the device has been tagged, or on local network separate from the IoT device then virtual local communication may be available when the user connects to the neighbor's WiFi network (see FIG. 2) or another local network.

If neither local nor virtual local communication is available, then the optimal communication pathway will be determined to be IoT cloud server 420. In such a case, the requests are then sent to the IoT cloud server 440. Otherwise, the IoT application will compare the available options to determine the optimal communication pathway 420. In an embodiment, if local or virtual local communication is available, either one may be designated by the IoT application to be automatically selected as the optimal communication pathway. For example, the IoT application may be configured to determine that local communication is the optimal communication pathway, and to automatically route communications to the local communication endpoint 430.

The decision to use local communication 430 or virtual local communication 450 instead of the IoT cloud server may be determined using one or more combinations of network speed, efficiency, and diagnostic considerations. The number of hops between the controlling device and the IoT device may be factored into the decision making process. The number of hops may be calculated when the user moves into a new location, and even before the IoT application is used. If the number of hops is less than a predetermined amount (e.g., three hops), then local or virtual communication is used.

The parameter information is used to determine optimal communication pathways, either through the IoT cloud server or direct local communication to the IoT device, and may occur during registration of the IoT device on which the IoT client application is used. In an embodiment, if the threshold parameter is not met, then communication will occur locally. For example, if the IoT location is less than the threshold distance from the IoT cloud server, then local, direct communication between the IoT client device and the IoT device occurs locally. If the distance exceeds the threshold, communication is routed through the IoT cloud server. In some situations, due to calculation latency, the IoT cloud server will be used initially, instead of the optimal pathway, as determined by the threshold determination process. In subsequent instances, however, the optimal communication pathway will be taken.

In an embodiment, when the mobile user device disconnects from a known WiFi network, the IoT application on the device may check if the mobile device is still in the same network as the IoT device and whether the IoT device may be reached faster with the local network than via the cloud network. If the connection is not quicker through the local network, then the IoT application may move its IoT application's communication endpoint from the local communication pathway to the IoT server in the cloud. The selection of optimal communication pathways contributes to significantly decreasing communication latency, and enables actions and operations to be performed quicker, to result in an improved user experience.

Once an optimal communication pathway has been determined 420, requests are sent from the local communication endpoint 430, the IoT cloud server endpoint 440, or the virtual local communication endpoint 450 to the IoT device 460.

The IoT cloud communication endpoints may be predefined and/or known in the IoT application, and the local IoT device endpoints may be retrieved from the IoT server. Information about the IoT device endpoints may be subject to an authentication process. For example, valid user credentials may be required to access the IoT device endpoints.

Similarly, local communication endpoints for each IoT device are obtained from the server. Each endpoint serves as the routing point for IoT control and monitoring requests for an IoT device. IoT application requests are forwarded to the local communication endpoint for the selected IoT device, and routed to the corresponding IoT device.

The IoT device receives the request and can send an update to the cloud server 470. The update may be, for example, information indicative of a state change of the IoT device, diagnostic information, or other information, depending on the request received from the IoT application. Alternatively, the IoT device may also be an IoT Devices Hub/Gateway, and the update information sent to the cloud server may be an aggregation of communications from one or more related or unrelated devices, as further described in FIG. 3.

Figure 5:
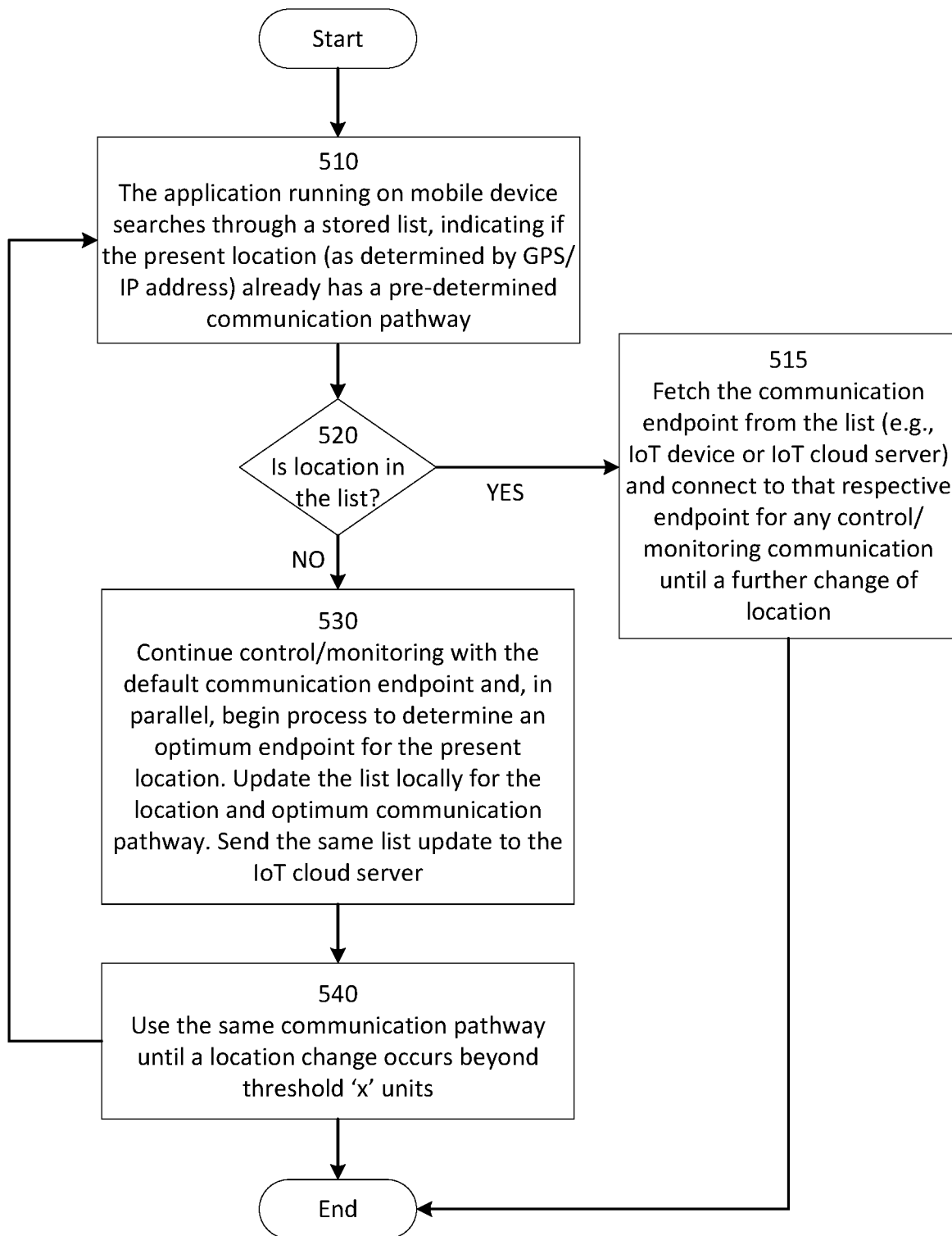
FIG. 5 depicts a process for switching communication pathways for optimal performance.

FIG. 5 depicts an example embodiment of a process of the present invention, wherein communications are routed through a certain pathway, based on the IoT device's location. The IoT application can record a location point when an optimal communication pathway has been established, and search for optimal communication pathways that have been previously established at that current location. Box 510 indicates that the IoT application may use its current location, as established by the mobile device's GPS or IP address, to search through a location list stored in the IoT application. The stored list indicates previously identified optimal communication paths at that current location, or within a pre-determined radius of that current location.

In box 520, the IoT application determines whether the present location is within the stored list, or within a certain distance range of a location in the list. If the location is identified, then aspects of box 515 are invoked, wherein the communication endpoint is fetched from the stored list. The communication endpoint may be the IoT device or IoT cloud server, for example. From there, the IoT device connects to that respective endpoint for any control or monitoring communications until a further change in location is identified.

Alternatively, if the IoT application determines that the present location is not within the stored list (i.e., no pre-determined pathway can be identified at that location), the box 530 is invoked. In this instance, all control and monitoring communication requests continue to be routed through the default communication endpoint (e.g., the IoT cloud server, direct communication, etc.). Simultaneously, a process is initiated, in parallel, to determine an optimal endpoint for the present location. This may occur using the process described in FIG. 4, for example. Once an optimal communication pathway is determined, the pathway is stored locally, and the list is updated to indicate the optimal pathway for that location. The list may then be sent to the IoT server using any of the methods described herein, in order to update the cloud server. Then, the same optimal communication pathway is used for routing communications until a change of location occurs beyond a threshold amount (e.g., 'x' units). Any changes in the location tag list may be automatically saved, and propagated to the IoT server.

Figure 6:
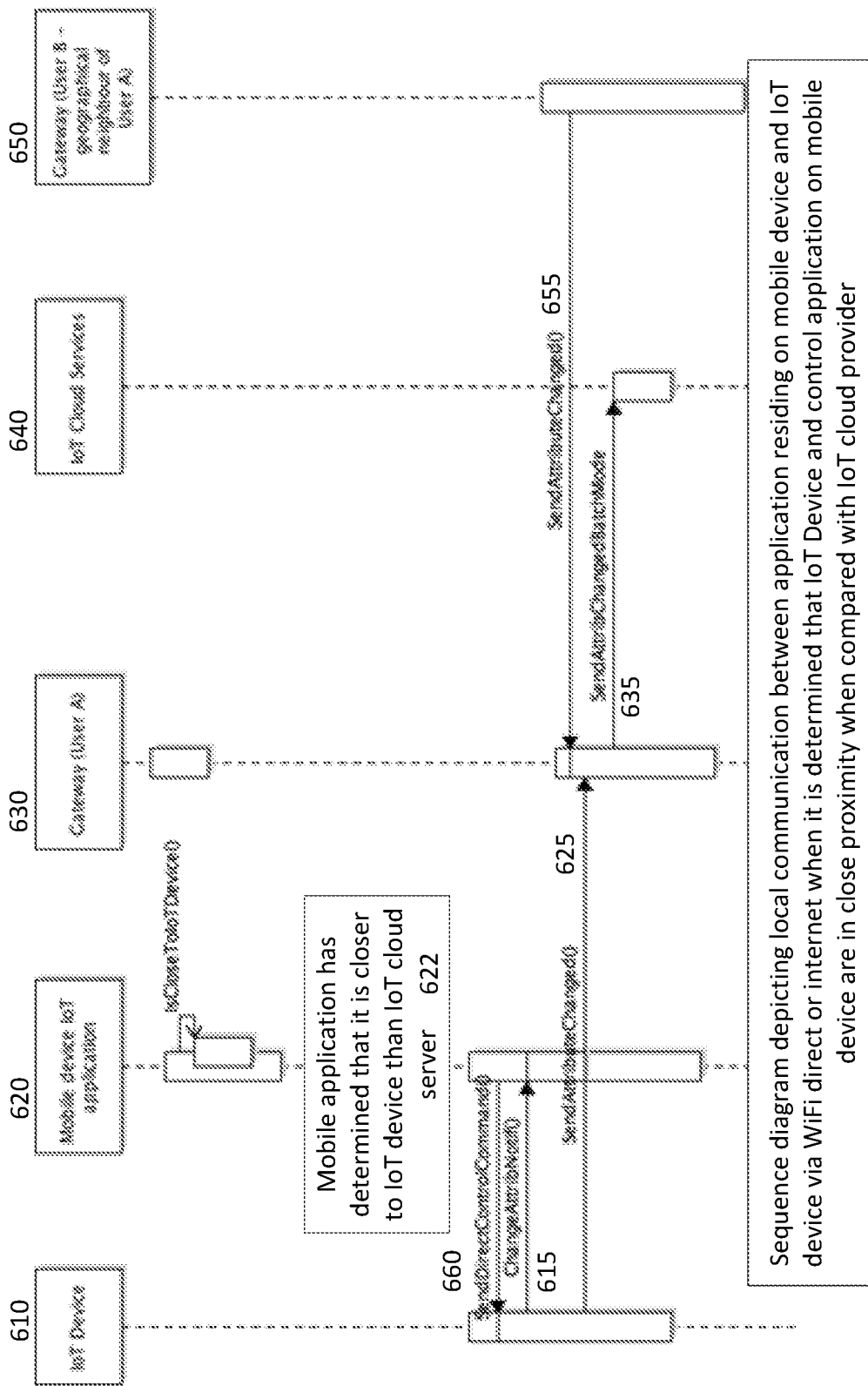
FIG. 6 depicts a sequence diagram for local communication and data aggregation on a master Gateway to the IoT cloud.

FIG. 6 is an exemplary sequence diagram for local communication and data aggregation on a master IoT Devices Hub/Gateway, and sending such communications in a batch to the IoT cloud server. The depicted embodiment illustrates a local communication pathway between an IoT application residing on a mobile device, and the IoT device. Communications may travel via WiFi or the Internet, after a determination that the IoT device and IoT control application and mobile device are within close proximity, when compared with the IoT cloud server/provider.

The mobile device running an IoT application 620 may first determine if the mobile device is closer to the IoT device than the IoT cloud server 622. This determination may be made through one or combination of methods described herein, and as illustrated in FIGS. 4-5. If it is determined that the mobile application is closer to the IoT device than the cloud server, a command to send the communication through direct communication can be initiated and executed 660. The IoT device 610 may then alter an attribute in accordance with the received command, and send a notification back to the mobile device and IoT application through the same communication pathway, to indicate that the attribute has been changed 615. Moreover, the IoT device 610 can send a notification to update the IoT cloud server 640 that the attribute has changed 625. The notification may first go through a Gateway device (e.g., User A) 630, where it may be aggregated along with notifications from co-located, but not necessarily related local IoT devices before being forwarded to the IoT cloud server in a batch 635.

In another aspect of the embodiment, a second Gateway (e.g., User B) 650 has information regarding one or more changed attributes of one or more IoT devices. The second Gateway 650 may be a geographical neighbor of the first Gateway 650, or within a predetermined number of hops. Control and monitoring communications and updates from IoT devices within the second Gateway's network may have been received and aggregated in a similar method as described with respect to mobile device IoT application 620, IoT device 620, attribute change 625, and Gateway 630. The aggregated communications can be forwarded to the first Gateway 630, and from there, sent in a batch 635 to the IoT cloud server.

Figure 7:
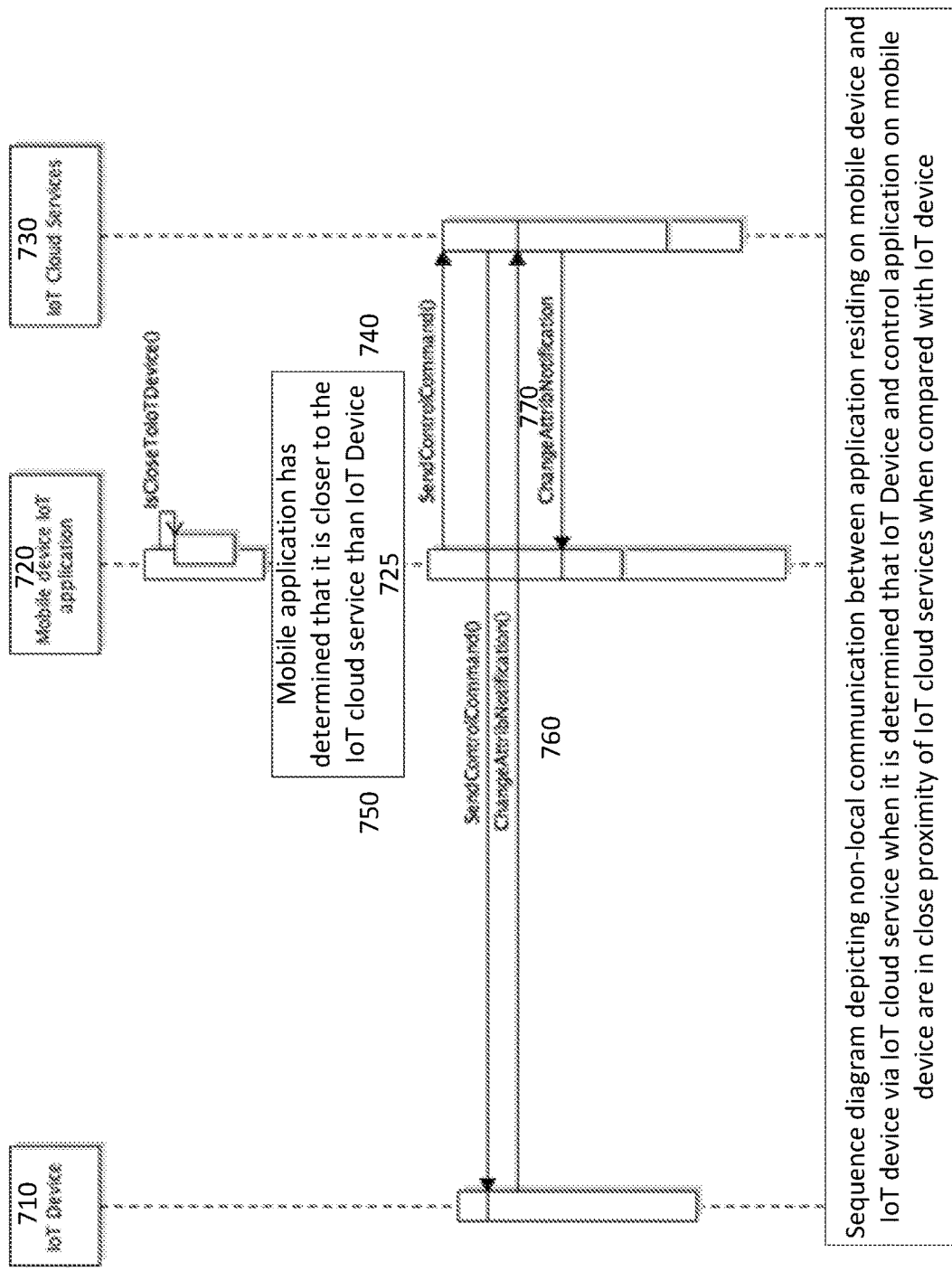
FIG. 7 depicts a sequence diagram for non-local communication in a conventional IoT system.

FIG. 7 depicts a similar sequence diagram, but illustrates an exemplary communication pathway using non-local communication between an IoT application on a mobile device and an IoT device. Such non-local communication is the conventional communication method, and may occur via an IoT cloud service when a determination is made that the IoT application/mobile device and are within closer proximity to an IoT cloud server than the IoT device.

At 725, the IoT application on the mobile device 720 can make a determination that the mobile device is closer to the IoT cloud service than the IoT device. Any of the above methods, or combinations of methods described above (see e.g., FIGS. 5-6) can be utilized to make that determination. When it is determined that the IoT cloud services (e.g., a cloud server) 730 are closer in proximity than the IoT device, a command to control or alter the state of an IoT device may be sent to an IoT cloud server 740. Then, the IoT cloud services can forward the control command 750 to the IoT device 710.

In response to the received command, the IoT device 710 can send a notification back to the IoT cloud server 730 indicating that the attribute has been changed. The server then sends the change attribute notification to the mobile device 770, and the IoT application can be updated with the new IoT device information.

Figure 8:
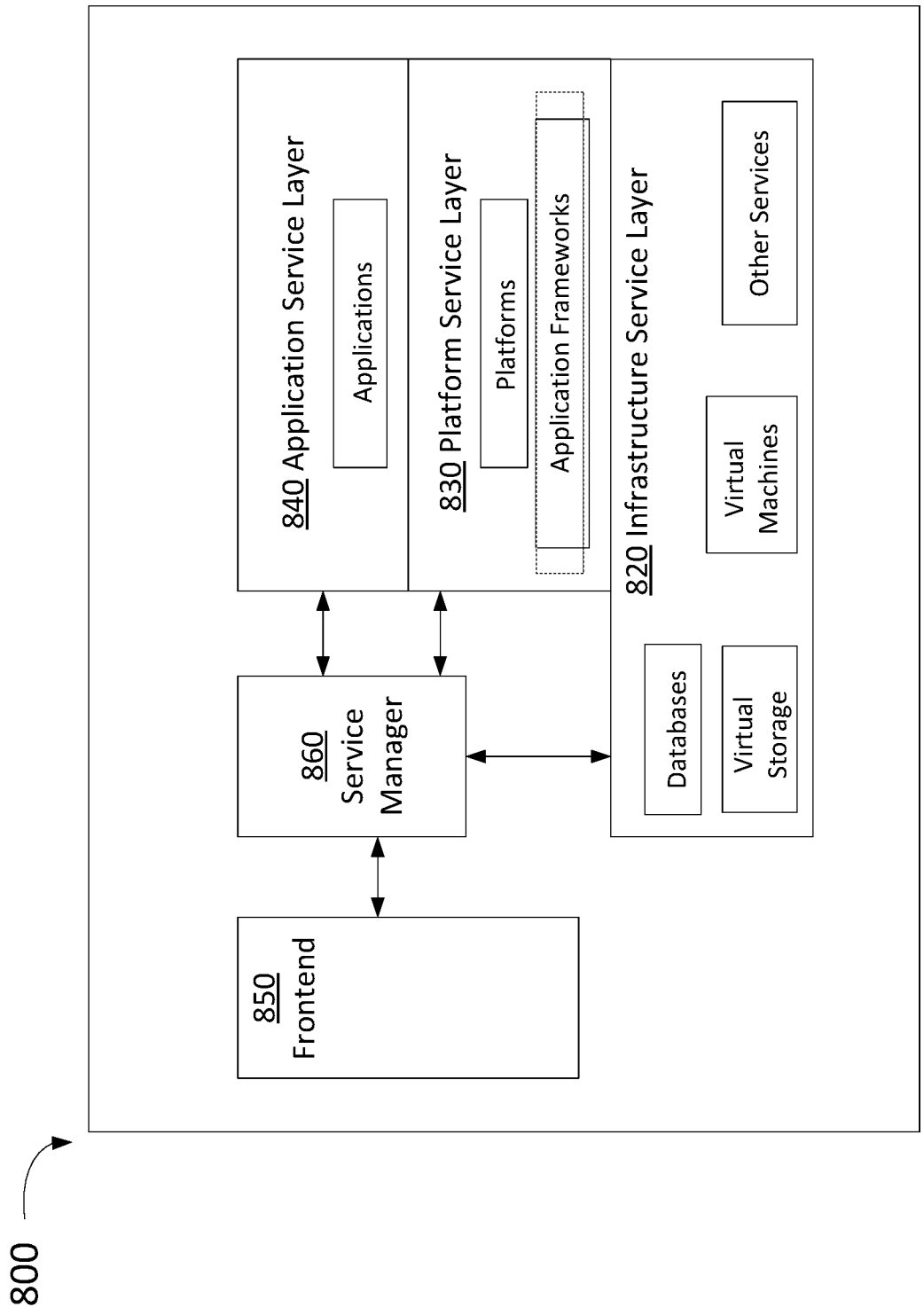
FIG. 8 is a schematic diagram illustrating an example cloud-based server that may be used in accordance with aspects of the present invention.

FIG. 8 is a schematic diagram illustrating an example cloud-based server 800 that may be used in accordance with the present disclosure. A cloud-based server 800 may provide infrastructure services, platform services, and software application services. In an embodiment, cloud-based server 800 is used to implement at least a portion of server 220 in FIG. 2. The infrastructure services may include virtualized resources, such as virtual machines, virtual storage, and so on. The infrastructure services may also include virtualized services, such as database services and others. Each of these infrastructure services may be deployed in an infrastructure service layer 820.

The scale and various aspects, such as data, connectivity, and dependency relationships within and between service components, of an infrastructure service deployment are configurable by an administrator user. For instance, the administrator user may submit a configuration specification to cloud-based server 800 via a frontend interface 850 and service manager 860. The configuration specification can be translated into infrastructure and kernel level APIs calls that create, re-create, move, or delete components such as virtual machines and services, and assign or change attributes of the components.

In addition to the infrastructure services, cloud-based server 800 may also provide platform services, such as an environment for running virtual machines or a framework for developing and launching a particular type of software applications. The platform services may be implemented in a platform service layer 830 over the infrastructure service layer 820, and may employ one or more infrastructure services configured in a particular manner. Configuration of platform services can be accomplished by program code written according to the APIs of the platform services and, optionally, the APIs of the infrastructure services that are employed in enabling the platform services.

In some examples, cloud-based server 800 may also provide software application services in an application service layer 840. A software application can be installed on one or more virtual machines or deployed in an application framework in the platform service layer 830. The software application can also communicate with one or more infrastructure service components, such as databases, in the infrastructure layer 820. The installation and configuration of the software application in the application service layer 840 can be accomplished through APIs of the software itself and the APIs of the underlying platform and infrastructure service components.

Depending on the type of services, a cloud-service user may be granted different levels of control in configuring the services. For example, if a software application service is employed, an administrator user is given control over how the software application is configured. If a platform service is employed, an administrative user is given control over how the platform and/or application frameworks are configured. Similarly, if infrastructure services are employed, an administrative user is given control over the particular infrastructure services employed.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive. It is to be understood that the subject matter defined in the appended claims is not necessarily limited to the specific features or acts described above. Rather, the illustrations of the aspects described herein are intended as examples of implementing the claims and other equivalent features and acts are intended to be within the scope of the claims.

The techniques, or certain aspects or portions thereof, may, for example, take the form of program code (i.e., instructions) embodied in tangible storage media or memory media implemented as storage devices, such as magnetic or optical media, volatile or non-volatile media, such as RAM (e.g., SDRAM, DDR SDRAM, RDRAM, SRAM, etc.), ROM, etc., that may be included in computing devices or accessible by computing devices. When the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

It should be understood that the various techniques described herein may be implemented in connection with hardware or software or, where appropriate, with a combination of both. The subject matter presented herein may be implemented as a computer process, a computer-controlled apparatus or a computing system or an article of manufacture, such as a computer-readable storage medium. The terms "circuitry", "component", or "module" are used interchangeably throughout and include hardware components such as hardware interrupt controllers, hard drives, network adaptors, graphics processors, hardware based video/audio codecs, and the firmware used to operate such hardware. The terms "circuitry", "component", or "module" can also include microprocessors, application specific integrated circuits, and processors, e.g., cores of a multi-core general processing unit that perform the reading and executing of instructions, configured by firmware and/or software. Processor(s) can be configured by instructions loaded from memory, e.g., RAM, ROM, firmware, and/or mass storage, embodying logic operable to configure the processor to perform a function(s).

In an example embodiment, where circuitry includes a combination of hardware and software, an implementer may write source code embodying logic that is subsequently compiled into machine readable code that can be executed by hardware. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and various aspects of disclosed processes may be stored, persistently or otherwise, in any type of non-transitory computer storage such as, e.g., volatile or non-volatile storage. The various features and processes described above may be used independently of one another, or may be combined in various ways. All possible combinations and sub combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. For purposes of this specification and the claims, the phrase "computer-readable storage medium" and variations thereof, does not include waves, signals, and/or other transitory and/or intangible communication media. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the disclosure. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of certain of the disclosure.

The invention claimed is:

1. A method for a communication between devices comprising:
   storing a list of one or more WiFi access points that a mobile device has connected to; and
   determining an optimal pathway for the communication from the mobile device to a controlled device, wherein:
   the optimal pathway comprises at least one hop from the controlled device,
   the controlled device is an Internet of Things (IoT) device, and
   the optimal pathway is determined according to a distance between the IoT device and an IoT cloud server.

2. The method of claim 1, wherein an application operating on the mobile device is operable to generate the optimal pathway.

3. The method of claim 1, wherein the method comprises selecting the optimal pathway from a plurality of pathways according to at least one of network traffic, location of the controlled device, and availability of at least one endpoint.

4. The method of claim 3, wherein the at least one endpoint comprises a virtual local endpoint.

5. The method of claim 1, wherein the method comprises sending the communication from the mobile device to the controlled device through the optimal pathway.

6. The method of claim 1, wherein the optimal pathway does not include a server.

7. The method of claim 1, wherein the optimal pathway comprises a WiFi direct connection.

8. The method of claim 1, wherein the optimal pathway is determined according to a number of hops between the mobile device and the controlled device.

9. The method of claim 1, wherein the method comprises receiving one or more state updates from a plurality of connected devices and routing the one or more state updates to a server.

10. The method of claim 1, wherein the method comprises compiling, via the controlled device, one or more state updates for a period of time.

11. A system for communication comprising:
    a mobile device configured to:
    store a list of one or more WiFi access points that the mobile device has connected to; and
    determine an optimal pathway between the mobile device and a controlled device, wherein:
    the optimal pathway comprises at least one hop from the controlled device,
    the controlled device is an Internet of Things (IoT) device, and
    the optimal pathway is determined according to a distance between the IoT device and an IoT cloud server.

12. The system of claim 11, wherein an application operating on the mobile device is operable to generate the optimal pathway.

13. The system of claim 11, wherein the mobile device is configured to select the optimal pathway from a plurality of pathways according to at least one of network traffic, location of the controlled device, and availability of at least one endpoint.

14. The system of claim 13, wherein the at least one endpoint comprises a virtual local endpoint.

15. The system of claim 11, wherein the mobile device is configured to send data from the mobile device to the controlled device through the optimal pathway.

16. The system of claim 11, wherein the optimal pathway does not include a server.

17. The system of claim 11, wherein the optimal pathway comprises a WiFi direct connection.

18. The system of claim 11, wherein the optimal pathway is determined according to a number of hops between the mobile device and the controlled device.

19. The system of claim 11, wherein the mobile device is configured to send one or more state updates from a plurality of connected devices to a server.

20. The system of claim 11, wherein mobile device is configured to receive one or more state updates compiled for a period of time by the controlled device.

* * * * *